US012083765B2

(12) United States Patent
Ohnishi

(10) Patent No.: US 12,083,765 B2
(45) Date of Patent: Sep. 10, 2024

(54) DEFECT DETECTING DEVICE AND BAG MAKING APPARATUS

(71) Applicant: Totani Corporation, Kyoto (JP)

(72) Inventor: Yuji Ohnishi, Kyoto (JP)

(73) Assignee: Totani Corporation, Kyoto (JP)

( * ) Notice: Subject to any disclaimer, the term of this patent is extended or adjusted under 35 U.S.C. 154(b) by 175 days.

(21) Appl. No.: 17/924,349

(22) PCT Filed: Apr. 22, 2021

(86) PCT No.: PCT/JP2021/016312
§ 371 (c)(1),
(2) Date: Nov. 9, 2022

(87) PCT Pub. No.: WO2022/004102
PCT Pub. Date: Jan. 6, 2022

(65) Prior Publication Data

US 2023/0182431 A1 Jun. 15, 2023

(30) Foreign Application Priority Data

Jun. 30, 2020 (JP) ................................ 2020-112435

(51) Int. Cl.

| | |
|---|---|
| ***B31B 70/00*** | (2017.01) |
| ***B31B 70/10*** | (2017.01) |
| ***B31B 70/26*** | (2017.01) |
| *B31B 155/00* | (2017.01) |
| *B31B 160/20* | (2017.01) |

(52) U.S. Cl.
CPC ............ *B31B 70/006* (2017.08); *B31B 70/10* (2017.08); *B31B 70/266* (2017.08); *B31B 2155/002* (2017.08); *B31B 2160/20* (2017.08)

(58) Field of Classification Search
CPC ... B65H 7/06; B31B 2155/002; B31B 70/266; B31B 70/10; B31B 70/006
See application file for complete search history.

(56) References Cited

U.S. PATENT DOCUMENTS 2,709,960 A * 6/1955 Alix ........................ B65H 7/06 101/247
3,803,989 A * 4/1974 Kuckhermann ........ B31B 70/56 493/318

(Continued)

FOREIGN PATENT DOCUMENTS

JP H1019557 1/1998
JP 2008207916 9/2008

*Primary Examiner* — Andrew M Tecco
*Assistant Examiner* — Nicholas E Igbokwe
(74) *Attorney, Agent, or Firm* — JCIPRNET

(57) ABSTRACT

A defect detecting device includes a detection unit and a movement mechanism. The detection unit includes a support, an arm supported by the support swingably around a swing shaft, and a sensor for detecting a displacement of the arm relative to the support. The arm includes contactors. The movement mechanism keeps the contactors away from a feed plane during a feed phase of a sheet panel, and moves the contactors to the feed plane and then moves the contactors from the feed plane during a pause phase of the sheet panel. The defect detecting device further includes a determination part configured to determine whether a defect in bag making is present based on data from the sensor.

11 Claims, 10 Drawing Sheets

(56) References Cited

U.S. PATENT DOCUMENTS

| | | | | |
|---|---|---|---|---|
| 2008/0047335 | A1* | 2/2008 | Kawasaki | G01Q 20/02 324/662 |
| 2016/0137446 | A1* | 5/2016 | Mizobe | B65H 1/04 271/265.01 |
| 2018/0339480 | A1* | 11/2018 | Yanagisawa | B31B 70/16 |
| 2022/0194045 | A1* | 6/2022 | Ohnishi | B31B 70/18 |
| 2023/0191738 | A1* | 6/2023 | Nagai | B31B 70/006 493/37 |

* cited by examiner

DEFECT DETECTING DEVICE AND BAG MAKING APPARATUS

CROSS-REFERENCE TO RELATED APPLICATION

This application is a 371 application of the International PCT application serial no. PCT/JP2021/016312, filed on Apr. 22, 2021, which claims the priority benefit of Japan Patent Application No. 2020-112435, filed on Jun. 30, 2020. The entirety of each of the above-mentioned patent applications is hereby incorporated by reference herein and made a part of this specification.

TECHNICAL FIELD

The present application relates to a defect detecting device for detecting a defect in bag making and a bag making apparatus including the defect detecting device.

BACKGROUND

For example, a bag making apparatus feeds two or more sheet panels (main components of a bag) each having a web shape, supplies an accessory component(s) such as a side gusset or a bottom gusset to a predetermined position on the sheet panel, and successively makes the bags from the sheet panels and the accessory component.

Whether the accessory component is present in an appropriate state at an appropriate position on the sheet panel can be determined using a change in the thickness of the components. As an example, when the side gusset is appropriately disposed at a predetermined position relative to the sheet panel, the thickness of the sheet panel and the side gusset is detected at the predetermined position. On the other hand, when the side gusset is misaligned relative to the sheet panel, the thickness of the sheet panel is detected at the predetermined position. In this manner, a defect in bag making changes the thickness at a specific position, and the defect can thus be detected using this change.

Such a technique is widely applied to bag making apparatuses. In Patent Document 1, detection of thickness changes is used to detect a foreign object adhering to a bag. In Patent Document 2, detection of thickness changes is used to detect a seam between sheet panels.

In both devices in Patent Documents 1 and 2, detection is performed while sheet panels are fed. In these devices, a contactor essential for detection, such as a roller, needs to be kept in contact with the sheet panel at all times, which is likely to damage the sheet panel.

An object of the present application is to provide a defect detecting device for detecting a defect in bag making, the defect detecting device being less likely to damage a component of a bag such as a sheet panel, and a bag making apparatus.

CITATION LIST

Patent Document

Patent Document 1: JP 2008-207916A Patent Document 2: JP H10-19557A

SUMMARY

According to an aspect of the present application, there is provided a defect detecting device for detecting a defect in bag making and for use in a bag making apparatus that intermittently feeds a sheet panel having a web shape in a longitudinal direction of the sheet panel, the defect detecting device including a detection unit, the detection unit including: a support; an arm supported by the support swingably around a swing shaft; and a sensor for detecting a displacement of the arm relative to the support. The arm includes a first contactor and a second contactor that are spaced at a predetermined angular distance from each other around the swing shaft. The defect detecting device further includes a movement mechanism for moving the detection unit between a first position where the first and second contactors are away from a feed plane for the sheet panel and a second position where the first and second contactors reach the feed plane. The movement mechanism is configured to, during a feed phase of the sheet panel, keep the detection unit located at the first position, and to, during a pause phase of the sheet panel, move the detection unit to the second position and then move the detection unit from the second position. The defect detecting device further includes a determination part configured to determine whether the defect is present at least based on data from the sensor obtained when the detection unit is located at the second position.

The determination part may be configured to determine that the defect is not present if a detection value obtained by the sensor when the detection unit is located at the second position is equal to a reference value, and determine that the defect is present if the detection value deviates from the reference value. Alternatively, the determination part may be configured to determine that the defect is not present if the detection value is within a reference range, and determine that the defect is present if the detection value is outside the reference range.

The sensor may be a range sensor disposed to measure a distance between the arm and the support. The determination part in this implementation may be configured to determine that the defect is not present if a distance measured when the detection unit is located at the second position is equal to the reference value, and determine that the defect is present if the measured distance deviates from the reference value. Alternatively, the determination part may be configured to determine that the defect is not present if the measured distance is within the reference range, and determine that the defect is present if the measured distance is outside the reference range.

For example, an angle sensor disposed to measure a swing angle of the arm relative to the support may be used instead of the range sensor. Furthermore, the determination part may be configured to determine the presence or absence of the defect using an angle measured as the detection value and the reference value/the reference range predetermined.

The defect detecting device may further include a warning device configured to output a warning when the determination part determines that the defect is present.

The first and second contactors may be spaced from each other in a width direction of the sheet panel.

Each of the first and second contactors may be a rolling element.

The detection unit may further include a biasing member disposed to bias the first and second contactors toward the sheet panel which is in the feed plane, when the detection unit is located at the second position.

According to another aspect of the present application, there is provided a bag making apparatus for successively making bags from a sheet panel having a web shape and an accessory component, the bag making apparatus including: a feed device configured to intermittently feed the sheet panel in a longitudinal direction of the sheet panel; a supply device configured to supply the accessory component to the sheet panel; and the above-described defect detecting device.

The defect detecting device may be disposed to detect a misalignment of the accessory component relative to the sheet panel.

The supply device may be configured to supply a gusset as the accessory component. The defect detecting device may be disposed to detect a folding failure of the gusset.

The supply device may supply, as the gusset, a side gusset folded in halves to the sheet panel during every intermittent feed cycle of the sheet panel.

DETAILED DESCRIPTION

Hereinafter, a defect detecting device and a bag making apparatus according to implementations will be described with reference to the drawings.

Bag Making Apparatus

Figure 1A:
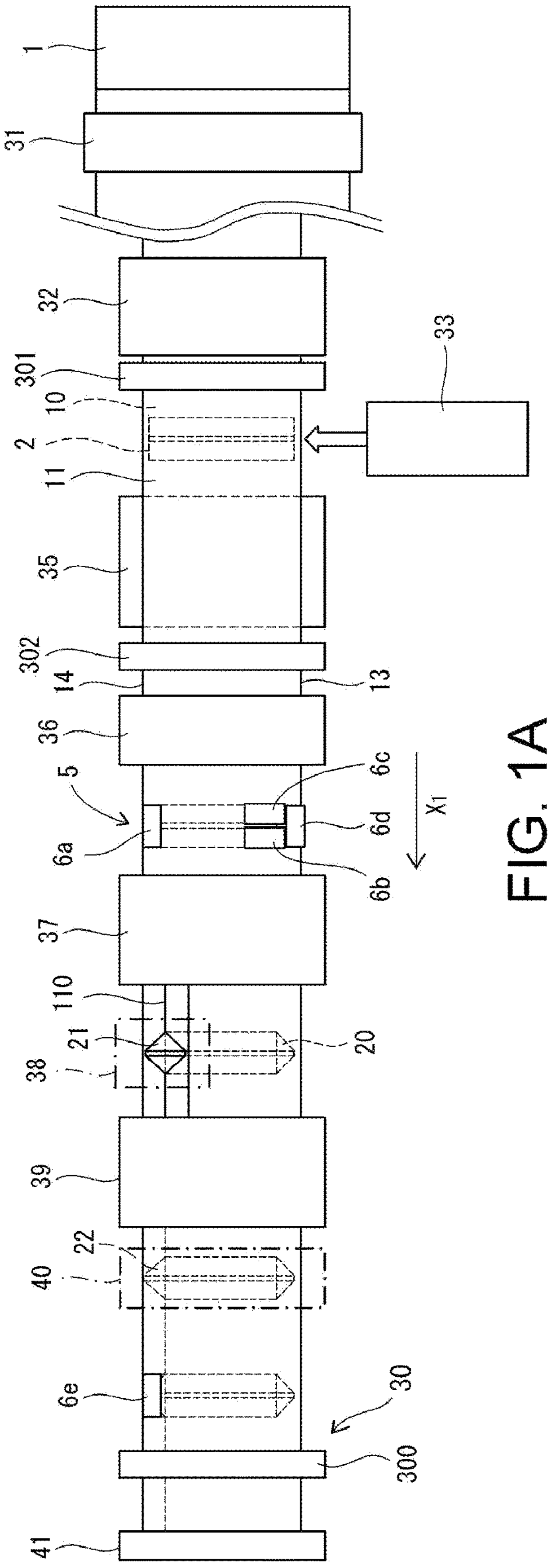
FIG. 1A is a schematic plan view of an example bag making apparatus.
Figure 1B:
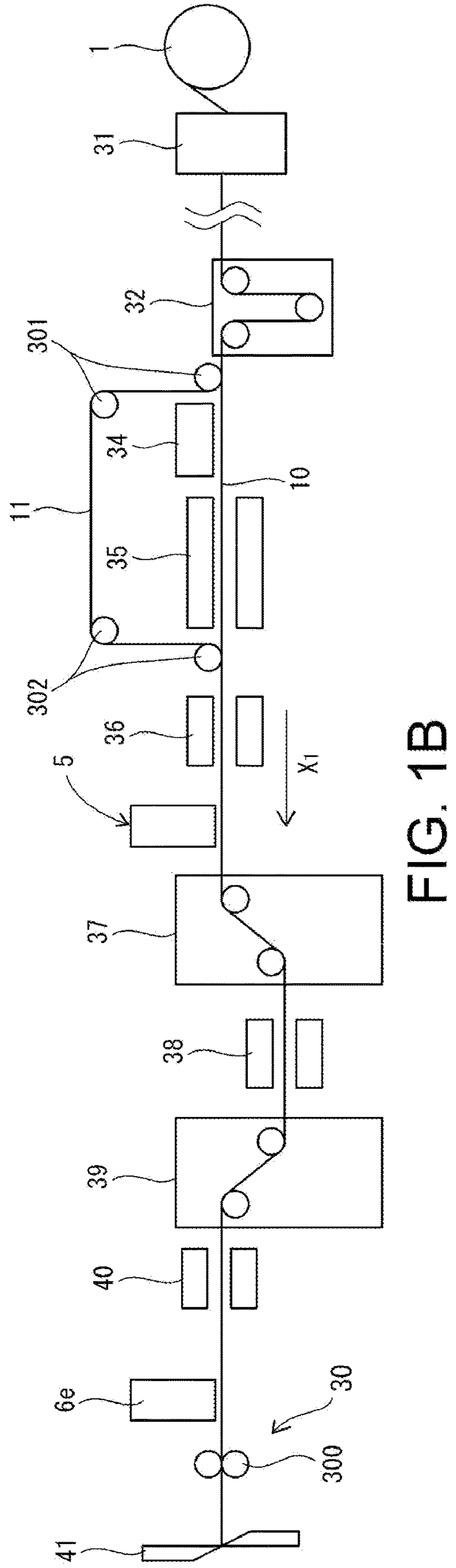
FIG. 1B is a front view of FIG. 1A.

FIGS. 1A and 1B schematically illustrate an example bag making apparatus. The bag making apparatus successively makes bags from sheet panels 10 and 11, and an accessory component(s) 2 (FIG. 1A). The sheet panels 10 and 11 are main components of the bags. In the implementation, the accessory component is a side gusset 2. The sheet panels 10 and 11, and the side gussets 2 are plastic films. Thus, the bag is a plastic bag. Instead of the plastic film, each of the components 10, 11, and 2 may include, for example, a base made of paper and a film or a resin material partly or fully laminated on the base.

The bag making apparatus includes a feed device 30 that intermittently feeds at least two sheet panels 10 and 11 each having a web shape in their longitudinal direction. Thus, the sheet panels 10 and 11 are repeatedly fed and paused. The reference sign $X_1$ designates a feed direction of the sheet panels 10 and 11. The feed device 30 includes a pair of feed rollers 300 that is driven to intermittently feed, in the direction $X_1$, the two sheet panels 10 and 11 sandwiched therebetween.

In the implementation, one wide web is continuously reeled off a roll 1, passes through an accumulation device 31, and is slit in the longitudinal direction into the sheet panels 10 and 11 by a slitter (not shown), and the sheet panels 10 and 11 are vertically superposed on each other by a guide device (not shown). Then, the sheet panels 10 and 11 pass through a dancer device 32. The dancer device 32 appropriately converts feed of the sheet panels 10 and 11 from continuous feed into intermittent feed.

The feed device 30 further includes a plurality of guide rollers 301 and 302 disposed downstream of the dancer device 32. The upper sheet panel 11 is separated from the lower sheet panel 10 by the guide rollers 301, and the sheet panels 10 and 11 are again superposed on each other by the guide rollers 302.

The bag making apparatus further includes a supply device 33 (FIG. 1A) that supplies the side gusset 2 to the sheet panel 10 or 11. The supply device 33 in the implementation is a well-known side gusset supply device that supplies a side gusset 2 to the lower sheet panel 10 during every intermittent feed cycle of the sheet panels 10 and 11.

The side gusset 2 has been folded in halves on the opposite sides with respect to the longitudinal centerline thereof in advance. The supply device 33 places the side gusset 2 on the upper surface of the sheet panel 10 in the width direction of the sheet panel 10 at a position downstream of the guide rollers 301 and upstream of the guide rollers 302. The side gusset 2 is thus interposed between the sheet panels 10 and 11 when the sheet panels 10 and 11 are superposed on each other by the feed device 30 (the guide rollers 302 thereof).

The bag making apparatus further includes a temporary fix device 34 (FIG. 1B) that temporarily fixes the side gusset 2 to the sheet panel 10 after the side gusset 2 is supplied to the sheet panel 10. The temporary fix device 34 adheres the side gusset 2 onto the sheet panel 10 in the form of, for example, ultrasonic-sealing or heat-sealing to temporarily fix the side gusset 2 during every intermittent feed cycle of the sheet panels 10 and 11. Specifically, during a pause phase of the sheet panels 10 and 11, the supply device 33 places the side gusset 2 on the sheet panel 10, and thereafter, the temporary fix device 34 temporarily fixes the side gusset 2 to the sheet panel 10. Such a temporary fix device 34 is well-known. A temporary fixing position is the longitudinal centerline of the side gusset 2.

The bag making apparatus further includes a folding device 35 that folds a first end of the side gusset 2 to form a triangular flap 20 (FIG. 1A). The folding device 35 is disposed downstream of the temporary fix device 34 and upstream of a position where the sheet panels 10 and 11 are superposed on each other. The folding device 35 folds both corners of the first end of the side gusset 2 at an angle of 45 degrees to form the triangular flaps 20 during every intermittent feed cycle of the sheet panels 10 and 11. Such a folding device 35 is well-known.

The bag making apparatus further includes a temporary seal device 36 that seals the side gusset 2 to the sheet panels 10 and 11 in order to form an open surface 21 (FIG. 1A) as described further below. The temporary seal device 36 seals the side gusset 2 to the sheet panels 10 and 11 at at least a second end (the end opposite to the triangular flaps 20) of the side gusset 2. This sealing may be in the form of heat-sealing. Such a temporary seal device 36 is well-known.

The bag making apparatus further includes a first forming device 37 that forms the open surface 21 on the side gusset 2. The first forming device 37 may be a well-known guide device including guide members such as a guide roller, a plate, or a pinch roller. As the sheet panels 10 and 11 are fed, the first forming device 37 guides the upper sheet panel 11 to fold the sheet panel 11 along a fold line 110. The fold line 110 extends in the longitudinal direction of the sheet panel 11. When the sheet panel 11 is rolled up and folded by the first forming device 37, an upper layer of the side gusset 2 is also pulled up together, since the side gusset 2 has been sealed at the second end thereof to both the sheet panels 10 and 11 by the temporary seal device 36. Thereby, the open surface 21 having a substantially rhombic shape is formed.

The bag making apparatus further includes a well-known open surface seal device 38 that is disposed downstream of the first forming device 37 and seals the open surface 21 to the sheet panels 10 and 11 during every intermittent feed cycle of the sheet panels 10 and 11.

The bag making apparatus further includes a second forming device 39 that forms an auxiliary gusset 22 (FIG. 1A) from the open surface 21. The second forming device 39 is disposed downstream of the open surface seal device 38. The second forming device 39 may be a well-known guide device including guide members such as a guide roller, a plate, or a pinch roller. As the sheet panels 10 and 11 are fed, the second forming device 39 guides the upper sheet panel 11 to fold the sheet panel 11 back along the fold line 110. This folding-back causes the open surface 21 to be folded in half along the fold line 110, so that the auxiliary gusset 22 is formed from the open surface 21.

The bag making apparatus further includes a well-known cross seal device 40 that is disposed downstream of the second forming device 39 and heat-seals the side gusset 2 to the sheet panels 10 and 11 in the width direction of the sheet panels 10 and 11 during every intermittent feed cycle of the sheet panels 10 and 11. The bag making apparatus further includes a well-known cross cut device 41 that is disposed downstream of the cross seal device 40 and cross-cuts the sheet panels 10 and 11 and the side gusset 2 in the width direction of the sheet panels 10 and 11 during every intermittent feed cycle of the sheet panels 10 and 11. A bag is made every cross-cutting. Although, in addition to the above, the bag making apparatus also includes, for example, a well-known longitudinal seal device that performs sealing parallel to the feed direction of the sheet panels 10 and 11, detailed description thereof is omitted.

Defect Detecting Device

Figure 2A:
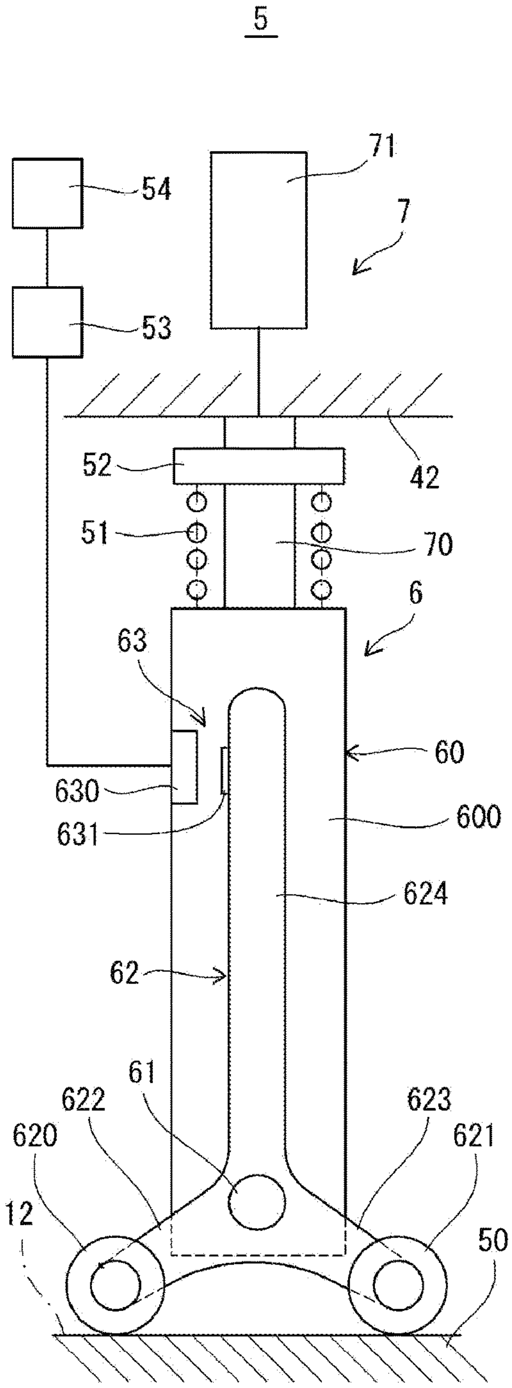
FIG. 2A is a schematic front view of an example defect detecting device.
Figure 2B:
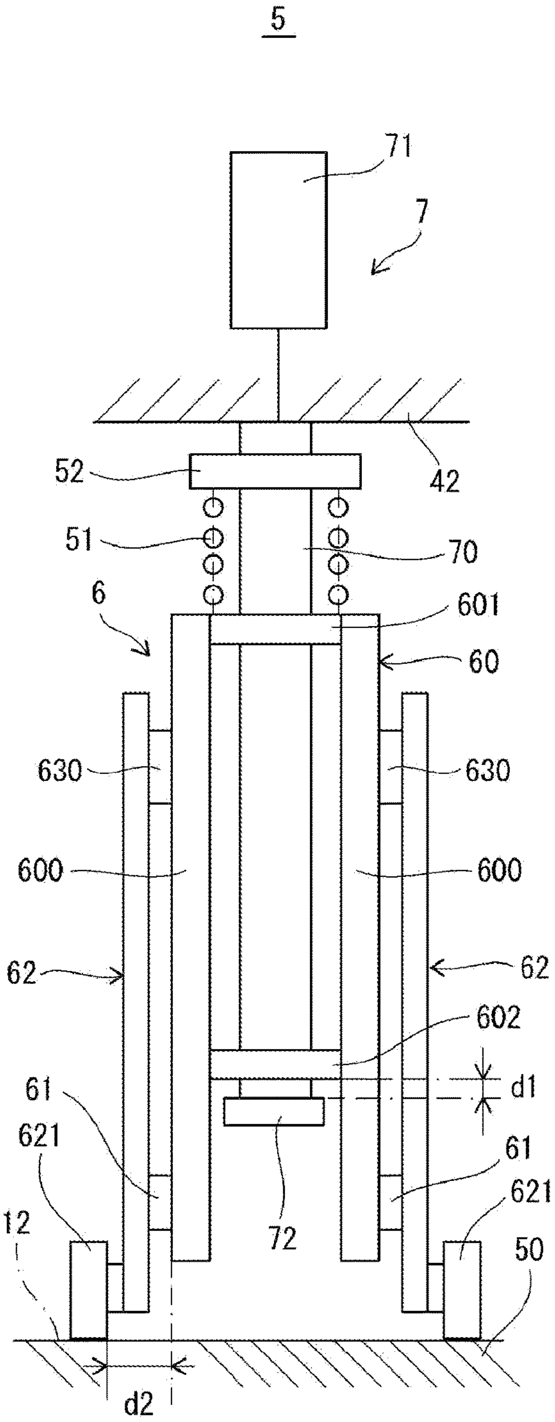
FIG. 2B is a side view of FIG. 2A.

As illustrated as an example in FIGS. 2A and 2B, the bag making apparatus further includes a defect detecting device 5 for detecting a defect in bag making.

The defect detecting device 5 includes a detection unit 6 and a movement mechanism 7.

As illustrated in FIG. 2A, the detection unit 6 includes a support 60, a swing shaft 61, an arm 62, and a sensor 63. The arm 62 is supported by the support 60 via the swing shaft 61 to be swingable around the swing shaft 61. The arm 62 includes a first contactor 620 and a second contactor 621 that are spaced at a predetermined angular distance from each other around the swing shaft 61. The sensor 63 is configured to detect a displacement of the arm 62 relative to the support 60.

As illustrated in FIG. 2B, the support 60 may include two side plates 600, an upper slider 601, and a lower slider 602. The two side plates 600 are coupled to each other via the upper and lower sliders 601 and 602. The swing shaft 61 extends parallel to a feed plane 12 for the sheet panels 10 and 11.

A lower base 50 may be provided. The upper surface of the lower base 50 and the feed plane 12 are located at the same height. Thus, the lower base 50 receives the sheet panel 10 or 11 being intermittently fed by the feed device 30.

The arm 62 may be biased in a counterclockwise direction in FIG. 2A (the direction in which a detection chip 631 approaches a sensor head 630) around the swing shaft 61. The arm 62 may be provided for each of the side plates 600. As illustrated in FIG. 2A, the arm 62 includes a first extending portion 622, a second extending portion 623, and a third extending portion 624 that extend in three different radial directions of the swing shaft 61 from the swing shaft 61. The first and second contactors 620 and 621 are respectively disposed on the tips of the first and second extending portions 622 and 623 facing the feed plane 12. Each of the contactors 620 and 621 in the implementation is a rolling element disposed to be rotatable, and specifically, may be a roller rotatably disposed.

The sensor 63 may be a range sensor that measures the distance between the support 60 and the arm 62 at a predetermined place. The sensor 63 is, for example, an eddy current displacement sensor, may include the sensor head 630 attached to the support 60/the arm 62 and the metallic detection chip 631 attached to the arm 62/the support 60 to face the sensor head 630, and may measure the distance from the sensor head 630 to the detection chip 631. Where a plurality of arms 62 are provided, the sensor 63 is provided for each of the arms 62.

In the implementation, the sensor head 630 is attached to the side plate 600, and the detection chip 631 is attached to the tip of the third extending portion 624 located opposite to the contactors 620 and 621. Thus, when the arm 62 swings relative to the support 60, the distance between the sensor head 630 and the detection chip 631 changes, so that the sensor measures the changed distance. In this manner, the displacement of the arm 62 relative to the support 60 can be detected. Alternatively, the range sensor may be, for example, an optical sensor.

Figure 3A:
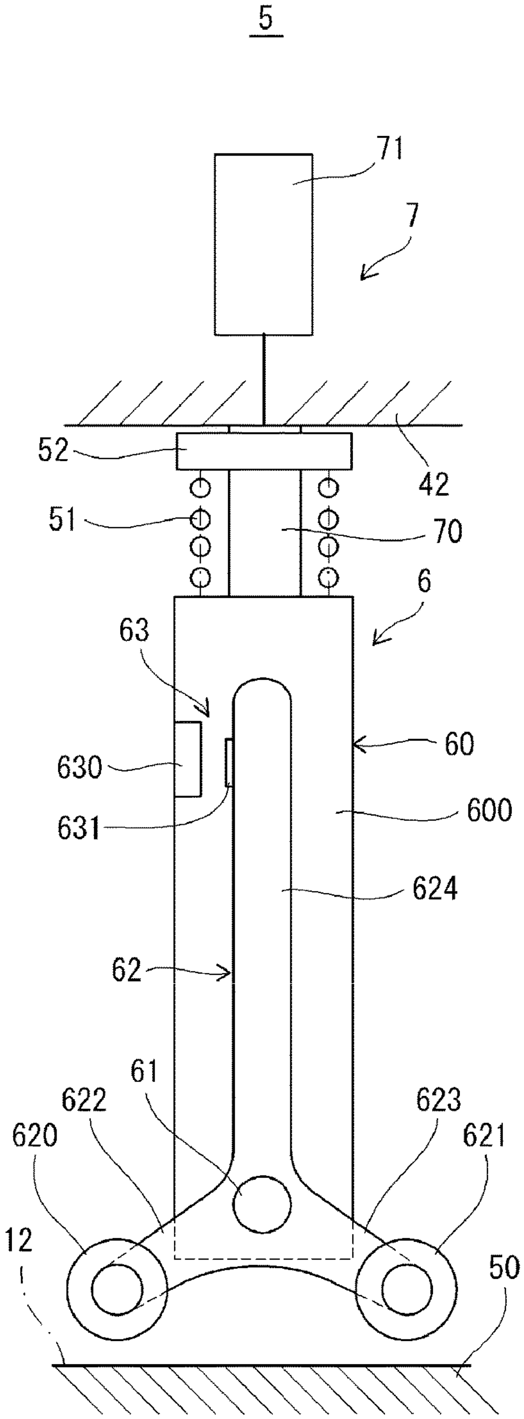
FIG. 3A and FIG. 3B are diagrams for illustrating an operation of a movement mechanism.
Figure 3B:
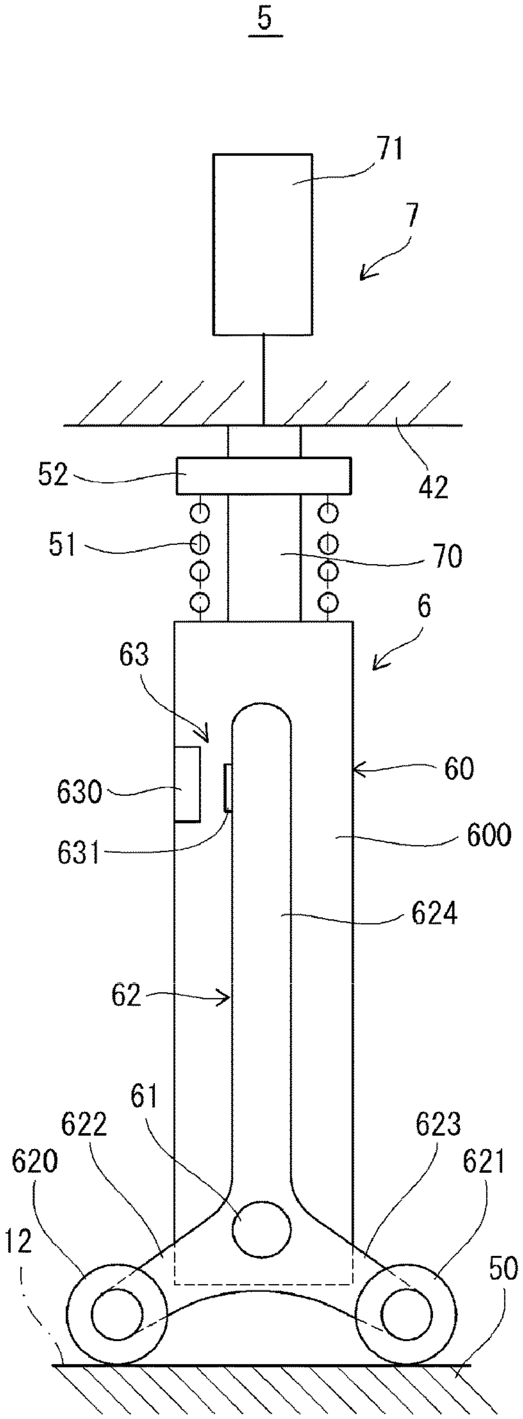

As illustrated in FIGS. 3A and 3B, the movement mechanism 7 is configured to move the detection unit 6 between a first position (FIG. 3A) where the first and second contactors 620 and 621 are away from the feed plane 12 and a second position (FIG. 3B) where the first and second contactors 620 and 621 reach the feed plane 12. Thus, when the detection unit 6 is located at the first position, the contactors 620 and 621 are not in contact with the components of the bag such as the sheet panels 10 and 11, and the side gusset 2 which are in the feed plane 12. On the other hand, when the detection unit 6 is located at the second position, the contactors 620 and 621 are in contact with any of the components which is in the feed plane 12, that is, the sheet panel 10 or 11, or the side gusset 2.

The movement mechanism 7 may include, for example, a support guide 70 that supports the detection unit 6 movably in the vertical direction and guides the detection unit 6, and an actuator 71 (e.g., a cylinder) attached to a frame 42 of the bag making apparatus to move the support guide 70 together with the detection unit 6 in the vertical direction relative to the feed plane 12. The defect detecting device 5 may further include a biasing member 51 disposed to bias the first and second contactors 620 and 621 toward the sheet panels 10 and 11 which are in the feed plane 12, when the detection unit 6 is located at the second position.

As illustrated in FIG. 2B, the support guide 70 extends in the vertical direction, and the upper and lower sliders 601 and 602 are disposed to be slidable along the support guide 70. A stopper 72 is disposed on the lower end of the support guide 70. The stopper 72 is configured to lock the support 60 (the lower slider 602 thereof). When the detection unit 6 is located at the second position where the contactors 620 and 621 are in contact with the sheet panel 10 or 11, the side gusset 2, or the lower base 50, the lock between the lower slider 602 and the stopper 72 is released, so that a distance d1 is created between the lower slider 602 and the stopper 72.

The biasing member 51 may be, for example, a coil spring. The support guide 70 having a columnar shape is inserted through the biasing member 51. The biasing member 51 is disposed and extends between an adjustment nut 52 and the detection unit 6, thereby biasing the detection unit 6 downward. The adjustment nut 52 is disposed on and around a threaded outer peripheral surface of the support guide 70 to be screwed therewith. A biasing force of the biasing member 51 can be adjusted by operating the adjustment nut 52 to move the adjustment nut 52 relative to the support guide 70 along the support guide 70.

According to this configuration, when the movement mechanism 7 moves the detection unit 6 from the first position to the second position to create distance d1, the biasing member 51 is compressed by the distance d1 to generate the predetermined biasing force. Thereby, the contactors 620 and 621 are biased toward the sheet panels 10 and 11 which are in the feed plane 12. This ensures that the contactors 620 and 621 are brought into intimate contact with the component 10, 11, or 2 of the bag.

When the movement mechanism 7 lifts the support guide 70 in a state illustrated in FIG. 2B using the actuator 71 by the distance d1, the stopper 72 is locked to the lower slider 602. Thus, when the movement mechanism 7 further lifts the support guide 70, the detection unit 6 moves upward together with the support guide 70, so that the contactors 620 and 621 are away from the feed plane 12. Thus, the biasing force is not applied to the component 10, 11, or 2.

The movement mechanism 7 keeps the detection unit 6 located at the first position during a feed phase of the sheet panels 10 and 11. Furthermore, during a pause of the sheet panels 10 and 11, the movement mechanism 7 moves the detection unit 6 from the first position to the second position and then moves the detection unit 6 from the second position to the first position.

As illustrated only in FIG. 2A, the defect detecting device 5 further includes a determination part 53 and a warning device 54. The determination part 53 is configured to determine whether a defect in bag making is present as described further below at least based on data from the sensor 63 obtained when the detection unit 6 is located at the second position. Hereinafter, an operation of defect detection will be described with reference to FIG. 4.

Figure 4:
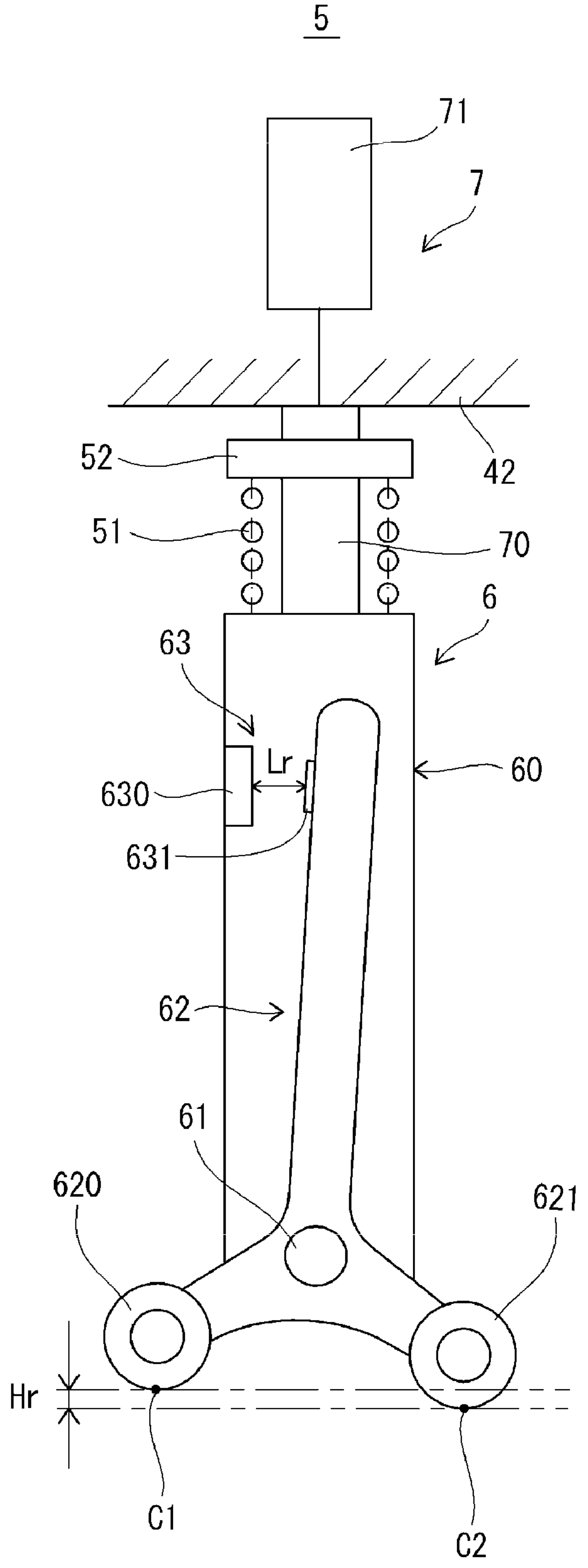
FIG. 4 is a diagram for illustrating a defect detecting method.

As illustrated in FIG. 4, the movement mechanism 7 moves the detection unit 6 from the first position to the second position to bring the contactors 620 and 621 into contact with the sheet panel 10, or 11 or the side gusset 2 during a pause of the sheet panels 10 and 11. FIG. 4 illustrates a state in which the contactors 620 and 621 are in contact with the component 10, 11, or 2 of the bag when no defect is present (illustration of the component is omitted). Reference signs C1 and C2 designate contact points of the contactors 620 and 621 with the component 10, 11, or 2, respectively. Reference sign Hr designates a relative height between the contactors 620 and 621 when no defect is present. Although Hr is not zero in the example of FIG. 4, Hr may become zero when no defect is present.

An output from the sensor 63 when no defect is present, that is, the distance Lr in the implementation is stored in a storage medium as a reference value in the detection unit 6. When no defect is present, the sensor 63 of the detection unit 6 located at the second position measures the same distance as the reference value Lr.

When a defect is present, the defect changes the thickness at this position. Thus, when the contactor 620 or 621 comes into contact with this defective point, the relative height between the contactors 620 and 621 differs from Hr, which causes a displacement (swing) of the arm 62 relative to the support 60. Thus, when a defect is present, the sensor 63 of the detection unit 6 located at the second position measures a distance different from the reference value Lr. The reference value Lr can vary depending on a defect to be detected.

Thus, the determination part 53 can detect the presence or absence of a defect based on the reference value Lr previously determined depending on a defect to be detected and a detection value obtained by the sensor 63 when the detection unit 6 is located at the second position (that is, when the contactors 620 and 621 are in contact with the sheet panel 10 or 11, or the side gusset 2).

Specifically, the determination part 53 compares a distance measured when the detection unit 6 is located at the second position with the reference value Lr. When the measured distance is equal to the reference value Lr, the determination part 53 determines that no defect is present. On the other hand, when the measured distance deviates from the reference value Lr, the determination part 53 determines that a defect is present.

Thereafter, the movement mechanism 7 moves the detection unit 6 from the second position to the first position to separate the contactors 620 and 621 from the sheet panel 10 or 11, or the side gusset 2. Then, the feed device 30 restarts to feed the sheet panels 10 and 11. Such an operation of defect detection is repeated during every intermittent feed cycle.

The determination part 53 may be implemented, for example, by a processor executing a program stored in a storage medium.

The warning device 54 is configured to output a warning when the determination part 53 determines that a defect is present. The warning device 54 may include a visual device such as an LED, a lamp, or a display, and/or an auditory device such as a speaker. Thus, the output of a warning may be executed by means of light emission and/or sound generation. The warning device 54 may be configured to display a defective point on a display.

Example of Defect Detection

Hereinafter, examples of defect detection in bag making will be described. As illustrated in FIG. 1A, in the bag making apparatus, a plurality of detection units 6*a* to 6*e* are provided. The movement mechanism 7, the biasing member 51, and the adjustment nut 52 (e.g., FIG. 2A) are provided for each of the detection units 6*a* to 6*e*.

Figure 5:
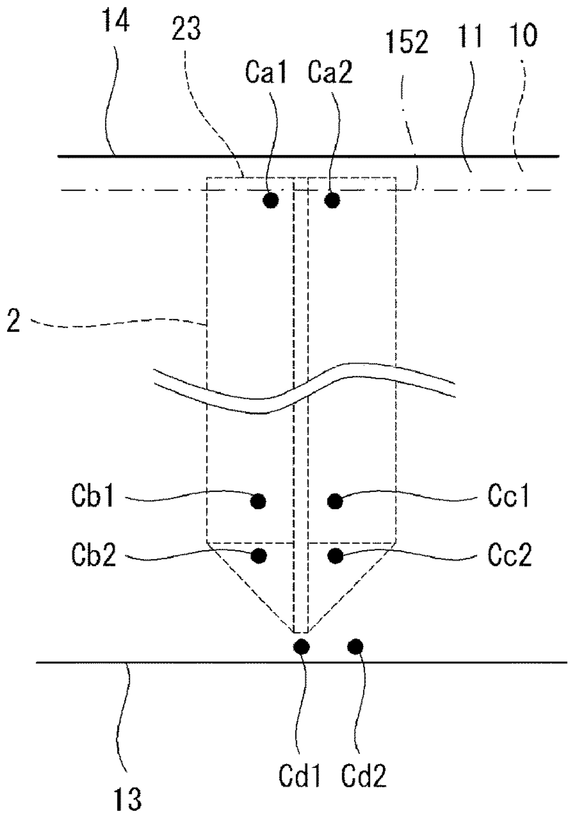
FIG. 5 is a diagram for illustrating an example of defect detection.

The detection units 6*a* to 6*d* are placed upstream of the first forming device 37 so as to face the side gusset 2 during a pause phase of the sheet panels 10 and 11. The defect detecting device 5 simultaneously determines the presence or absence of a defect at a plurality of points using the detection units 6*a* to 6*d*. FIG. 5 illustrates example settings of the respective contact points Ca1, Ca2, Cb1, Cb2, Cc1, Cc2, Cd1, and Cd2 of the contactors 620 and 621 of the detection units 6*a* to 6*d*.

Figure 6A:
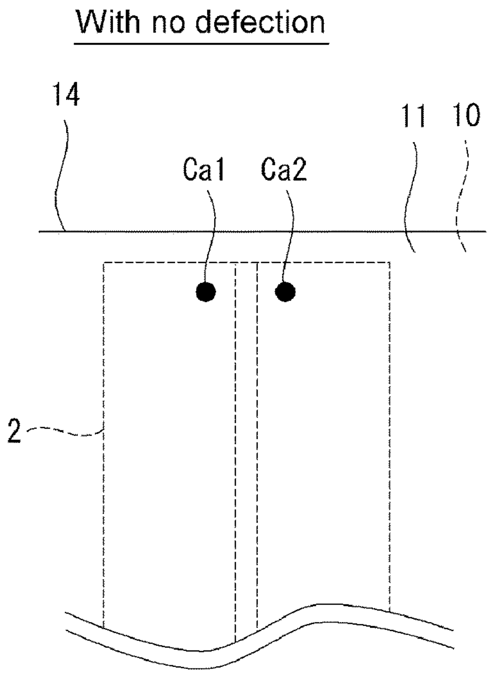
FIGS. 6A and 6B are diagrams for illustrating an example of the defect detection.
Figure 6B:
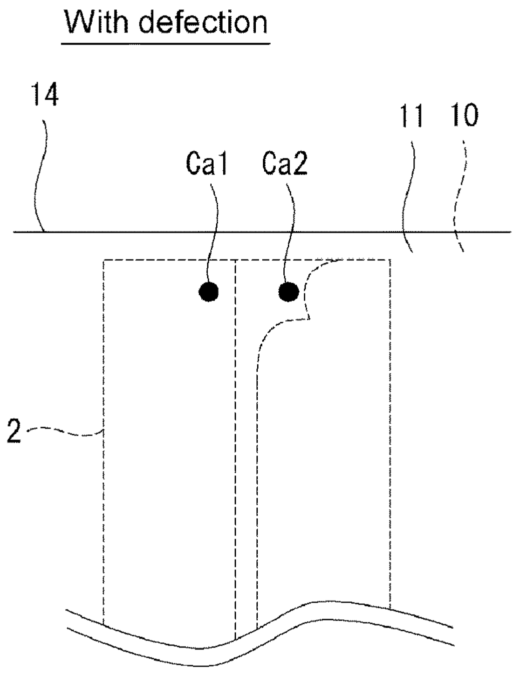

The detection unit 6*a* is used to detect, as a defect, the presence or absence of a curling-up portion of the side gusset 2 (an example of a folding failure). As illustrated in FIG. 6A, when no curling-up portion is present, the contact points Ca1 and Ca2 are at the same height. On the other hand, as illustrated in FIG. 6B, when a curling-up portion is present, the contact points Ca1 and Ca2 are at different heights. Thus, when a curling-up portion is present, a distance measured by the sensor 63 deviates from the reference value Lr. Thus, the determination part 53 can determine whether a curling-up portion is present based on data from the sensor 63.

Figure 7A:
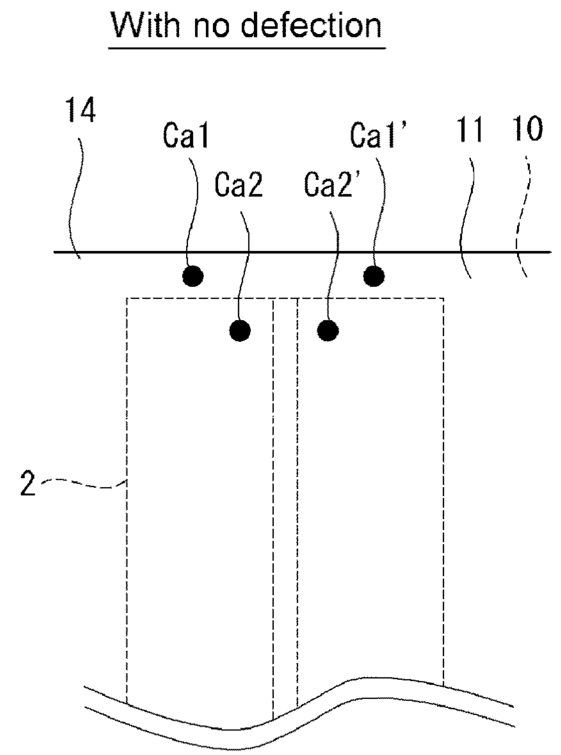
FIGS. 7A and 7B are diagrams for illustrating an example of the defect detection.
Figure 7B:
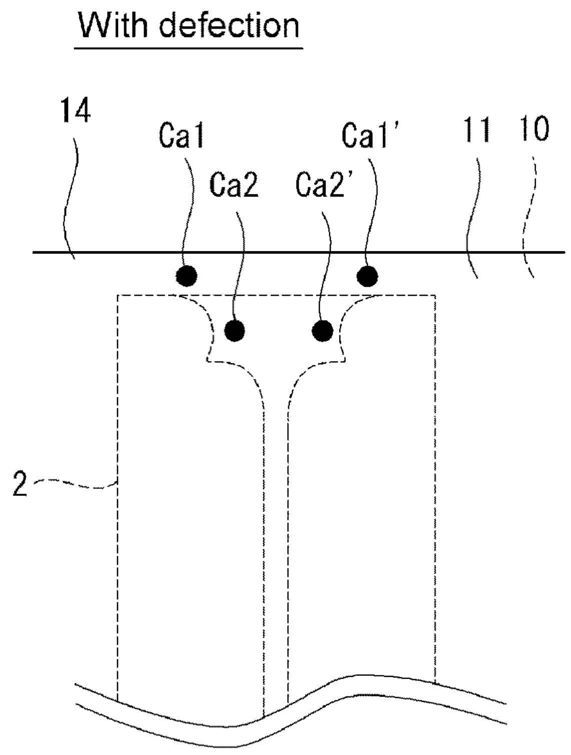

As illustrated in FIGS. 7A and 7B, the presence or absence of a curling-up portion may be detected at two different points. In this case, two detection units 6*a* are provided, or one detection unit 6*a* includes two arms 62. The contact points Ca1 and Ca2 are paired, and contact points Ca1' and Ca2' are paired. As is obvious from FIGS. 7A and 7B, the height of the contact point Ca2/Ca2' differs between when a curling-up portion (defect) is present and when no curling-up portion (defect) is present. Thus, the determination part 53 can detect the presence or absence of a curling-up portion at multiple points. Where multiple detection points are set in this manner, the warning device 54 may output a warning when a defect is present at any one of the detection points.

Figure 8A:
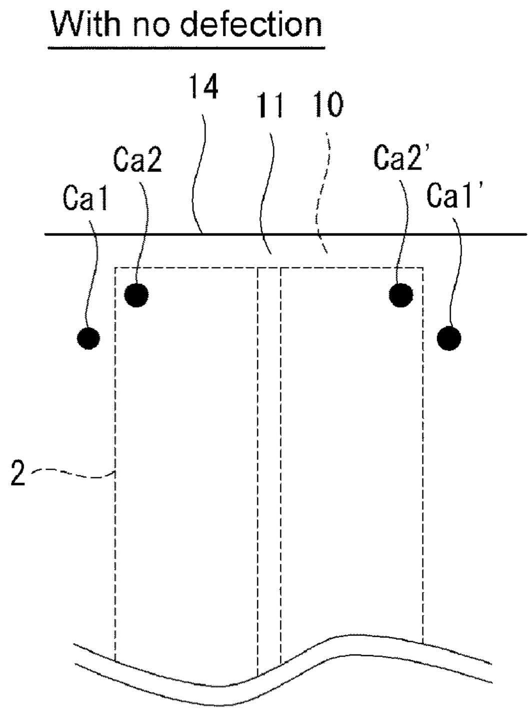
FIGS. 8A and 8B are diagrams for illustrating an example of the defect detection.
Figure 8B:
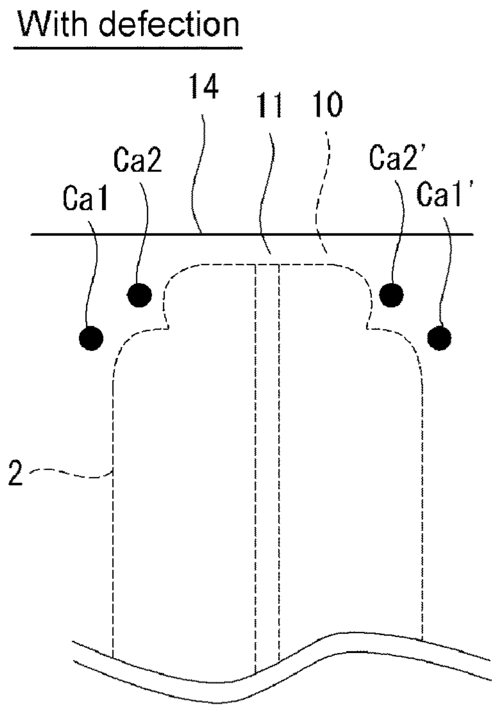

As illustrated in FIGS. 8A and 8B, it is also possible to detect the presence or absence of a curling-up portion that may occur at the corners on both sides of the side gusset 2. When no curling-up portion is present as illustrated in FIG. 8A, the contact points Ca1 and Ca2 are at different heights. On the other hand, when a curling-up portion is present as illustrated in FIG. 8B, the contact points Ca1 and Ca2 are at the same height. The same applies to the contact points Ca1' and Ca2'.

Figure 9:
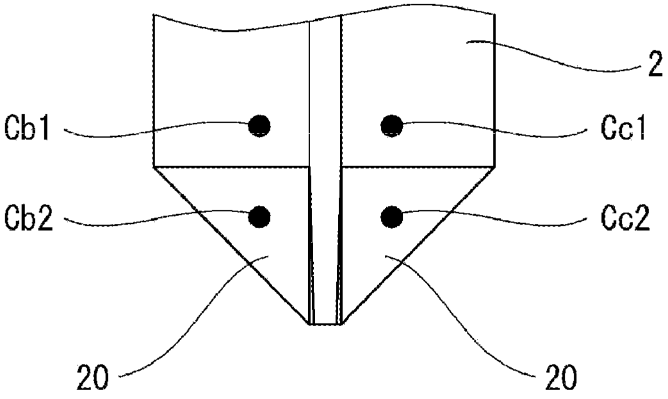
FIG. 9 is a diagram for illustrating an example of the defect detection.

Each of the detection units 6*b* and 6*c* is used to detect, as a defect, the presence or absence of formation of the triangular flap 20 of the side gusset 2 (an example of the folding failure). That is, when the triangular flap 20 is appropriately formed as illustrated in FIG. 9 (when no defect is present), the contact points Cb1 and Cb2 are at different heights. On the other hand, when the triangular flap 20 is not formed, the contact points Cb1 and Cb2 are at the same height (not shown). The same applies to the contact points Cc1 and Cc2. Thus, the determination part 53 can determine the presence or absence of formation of the triangular flap 20 based on data from the sensor 63.

The presence or absence of formation of both the triangular flaps 20 may be detected using one detection unit 6 including two arms 62.

Figure 10:
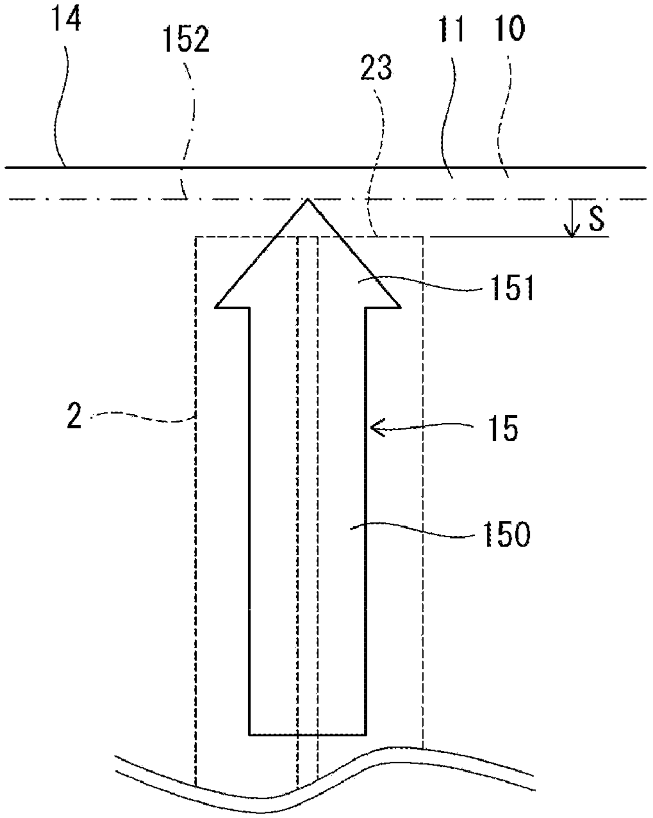
FIG. 10 illustrates an example defect.

The detection unit 6*d* is used to detect, as a defect, a misalignment of the side gusset 2 toward a first side edge 13 (FIG. 5) of the sheet panels relative to the sheet panels 10 and 11. FIG. 10 illustrates arrangement of the side gusset 2 wherein the edge 23 where the open surface 21 (FIG. 1A) is formed is displaced toward the first side edge 13 relative to an allowable limit line 152 (see arrow S). Reference numeral 14 designates a second side edge of the sheet panels, and reference numeral 15 designates a temporary sealed section formed by the temporary seal device 36 (FIG. 1A). The temporary sealed section 15 includes a rectangular sealed section 150 and a triangular sealed section 151 located on one end of the section 150, and is drawn on a larger scale than actual in FIG. 10 for the sake of convenience. The allowable limit line 152 is a virtual line extending through the tip of the temporary sealed section 15 (the triangular sealed section 151) in the longitudinal direction of the sheet panels 10 and 11.

As illustrated in FIG. 10, when the edge 23 is displaced toward the first side edge 13 relative to the allowable limit line 152, the sheet panels 10 and 11 are sealed to each other in the tip area of the triangular sealed section 151. Thus, the first forming device 37 fails to perform processing for forming the open surface 21 (FIG. 1A).

As illustrated in FIG. 5, the contact points Cd1 and Cd2 of the detection unit 6*d* are set at positions close to the first side edge 13. As illustrated in FIG. 5, when the side gusset 2 is placed in such a manner that the edge 23 is located closer to the second side edge 14 than the allowable limit line 152 is or located on the allowable limit line 152 (when no defect is present), the contact points Cd1 and Cd2 are at the same height. On the other hand, as illustrated in FIG. 10, when the side gusset 2 is placed in such a manner that the edge 23 is located closer to the first side edge 13 than the allowable limit line 152 is (when a defect is present), the contact points Cd1 and Cd2 are at different heights (because the height of the contact point Cd1 when a defect is present is higher than that when no defect is present). Thus, the determination part 53 can determine the presence or absence of a misalignment of the side gusset 2 relative to the sheet panels 10 and 11 based on data from the sensor 63.

Figure 11A:
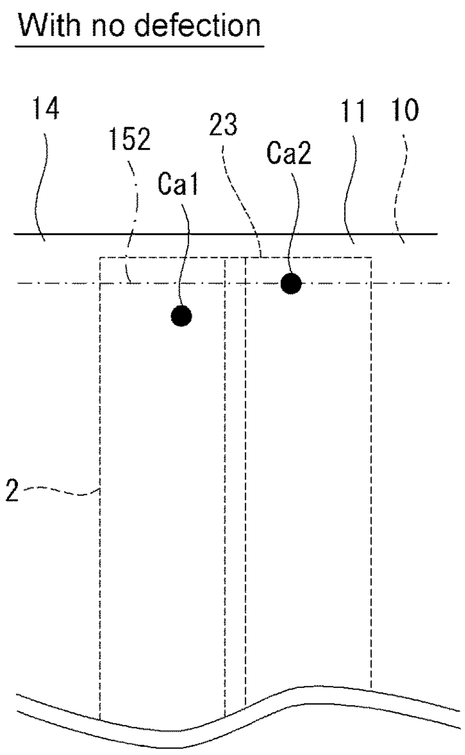
FIGS. 11A and 11B are diagrams for illustrating an example of the defect detection.
Figure 11B:
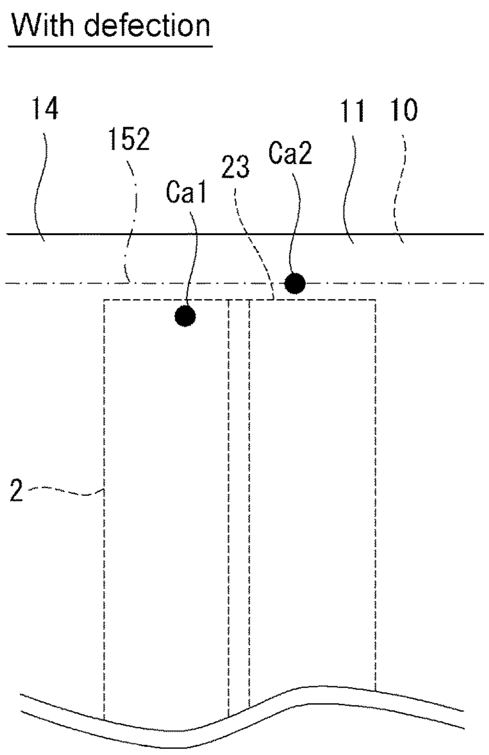

As illustrated in FIGS. 11A and 11B, the detection unit 6*a* may be used instead of the detection unit 6*d*. One contact point Ca1 is set closer to the first side edge 13 (FIG. 5) than the allowable limit line 152 is. The other contact point Ca2 is set on the allowable limit line 152. As illustrated in FIG. 11A, when the side gusset 2 is placed in such a manner that the edge 23 is located closer to the second side edge 14 than the allowable limit line 152 is or located on the allowable limit line 152 (when no defect is present), the contact points Ca1 and Ca2 are at the same height. On the other hand, as illustrated in FIG. 11B, when the side gusset 2 is placed in such a manner that the edge 23 is located closer to the first side edge 13 than the allowable limit line 152 is (when a defect is present), the contact points Ca1 and Ca2 are at different heights (because the height of the contact point Ca2 when a defect is present is lower than that when no defect is present).

Figure 12:
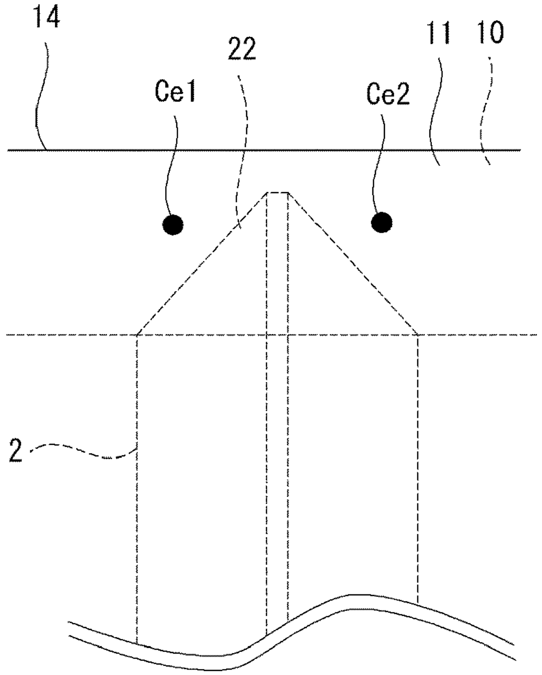
FIG. 12 is a diagram for illustrating an example of the defect detection.

The detection unit 6*e* in FIG. 1A is disposed downstream of the second forming device 39 and used to determine the presence or absence of a formation failure of the auxiliary gusset 22 (an example of the folding failure). FIG. 12 illustrates settings of the contact points Ce1 and Ce2 of the detection unit 6*e*. As illustrated in FIG. 12, when the auxiliary gusset 22 is appropriately formed (when no defect is present), the contact points Ce1 and Ce2 are at the same height. On the other hand, when the auxiliary gusset 22 is not appropriately formed (when a defect is present), the contact points Ce1 and Ce2 are not at the same height. Thus, the determination part 53 can determine a formation failure of the auxiliary gusset 22 based on data from the sensor 63.

As described above, the defect detecting device 5 can detect various defects in bag making using the detection unit 6. As described in the implementation, since the movement mechanism 7 brings the contactors 620 and 621 into contact with the component 10, 11, or 2 of the bag only when the sheet panels 10 and 11 are being paused, the component 10, 11, or 2 is less likely to be damaged.

Also, since the contactors 620 and 621 are not in constant contact with a measurement surface, measurement can be performed without any problems not only on continuous measurement surfaces, but also on discontinuous measurement surfaces with a step. For example, in a zone where the sheet panels 10 and 11 are separated from each other in FIG. 1B, a step generated by an edge (boundary) of the side gusset 2 placed on the sheet panel 10 may be measured.

Since the contactors 620 and 621 are brought into contact with the component 10, 11, or 2 not during a feed phase, but during a pause phase of the sheet panels 10 and 11, intimate contact of the contactors 620 and 621 with the component 10, 11, or 2 of the bag is ensured even if the biasing force of the biasing member 51 is weak. This contributes to reducing the weight or cost of the detection unit 6.

The bag making apparatus is merely an example. The accessory component may be a gusset other than the side gusset, such as a bottom gusset or a top gusset. The accessory component may be a top face portion or a bottom face portion that does not function as a gusset. The accessory component may be a zipper for opening and closing a bag. Thus, in addition to or instead of the side gusset supply device, a supply device that supplies another accessory component may be provided. Also, the bag making apparatus may provide multiple-line bag making.

The detection unit 6 can be oriented such that the contactors 620 and 621 can be spaced from each other in both the longitudinal direction and the width direction of the sheet panels 10 and 11. The detection unit 6 have a high degree of flexibility in its orientation and can be used to detect various defects in bag making.

Figure 13:
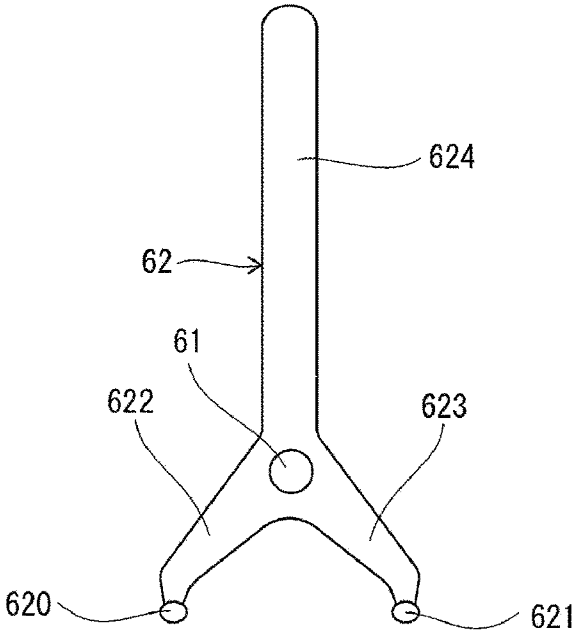
FIG. 13 illustrates another example arm.

As illustrated in FIG. 13, the first and second contactors 620 and 621 may be balls that are smaller than the rollers and rollably provided on the tips of the first and second extending portions 622 and 623, respectively. Defect detection can be performed in a narrow area by using such a ball. Although it is preferable that the first and second contactors 620 and 621 are rolling elements such as rollers or balls in view of preventing the component 10, 11, or 2 of the bag from being damaged, the first and second contactors 620 and 621 may be composed of the tips of the first and second extending portions 622 and 623.

The contact points C1 and C2 may be adjusted by adjusting a dimension d2 in FIG. 2B.

The detection unit 6 may be configured such that the distance between the sensor head 630 and the detection chip 631 increases when a defect is present. This prevents collision of the sensor head 630 with the detection chip 631.

The support guide 70 of the movement mechanism 7 may be omitted. The support 60 may be directly coupled to the actuator 71 and moved by the actuator 71. Also, the arm 62 may be vertically movable and swingable relative to the support 60 with the biasing force applied thereto toward the sheet panels 10 and 11 which are in the feed plane 12.

As the sensor 63, an angle sensor disposed to measure a swing angle of the arm 62 relative to the support 60 may be used instead of the range sensor. The angle sensor is, for example, a rotary encoder. In this case, the reference value used for defect detection is not a distance, but an angle.

The determination part 53 determines the presence or absence of a defect based on the detection value (e.g., a measured distance or angle obtained when the detection unit 6 is located at the second position) and the reference value. Taking an allowable error or the like into consideration, the determination part 53 may determine the presence or absence of a defect based on the detection value and a predetermined reference range. The reference range is a certain range including the reference value. The determination part 53 determines that no defect is present when the detection value is within the reference range and determines that a defect is present when the detection value is outside the reference range.

The reference value may be calculated in advance by a user or a processor of the bag making apparatus based on a defect to be detected, the thickness of the component 10, 11, or 2, the configuration of the detection unit 6, etc. Alternatively, the reference value may be acquired by actual measurement in advance in a preparatory stage before operation (bag making process). In the preparatory stage, the contactors 620 and 621 are brought into contact with the component 10, 11, or 2 with no defect at a point where detection is to be performed. Then, a detection value (e.g., the measured distance or angle) obtained by the sensor 63 at this contact is stored, as the reference value (normal value), in a storage medium of the defect detecting device 5 or the bag making apparatus. During operation of the bag making apparatus, the defect detecting device 5 detects a defect as described above using the reference value obtained in this manner or a reference range determined based on the reference value.

The timing of bringing the contactors 620 and 621 into contact with the component 10, 11, or 2 for defect detection may be determined in advance according to the type of a bag to be made. For example, in one implementation, the actuator 71 and the support guide 70 are disposed on a structural member that moves in conjunction with a sealing operation by the bag making apparatus. In this implementation, only when the structural member is moving during operation of the bag making apparatus, the contactors 620 and 621 can be brought into contact with the component 10, 11, or, 2 to detect a defect. During non-operation of the bag making apparatus, the structural member is located at a top dead center. As a result, the actuator 71 and the support guide 70 are too far apart from the feed plane 12, and the contactors 620 and 621 fail to be brought into contact with the component 10, 11, or, 2. Thus, in this implementation, the reference value fails to be measured in the preparatory stage before operation.

Thus, a modification in this implementation provides an example defect detecting device 5 configured to be capable of measuring the reference value in advance by lifting the lower base 50 to bring the contactors 620 and 621 into contact with the component 10, 11, or 2 before operation (bag making process).

Figure 14:
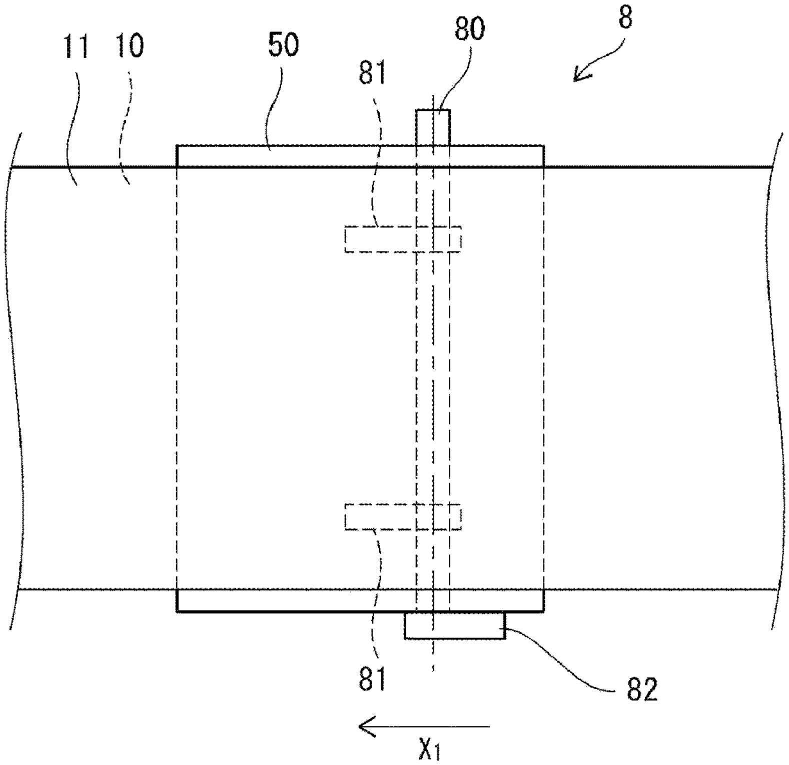
FIG. 14 is a schematic plan view of an example lifting mechanism for a lower base.
Figure 15B:
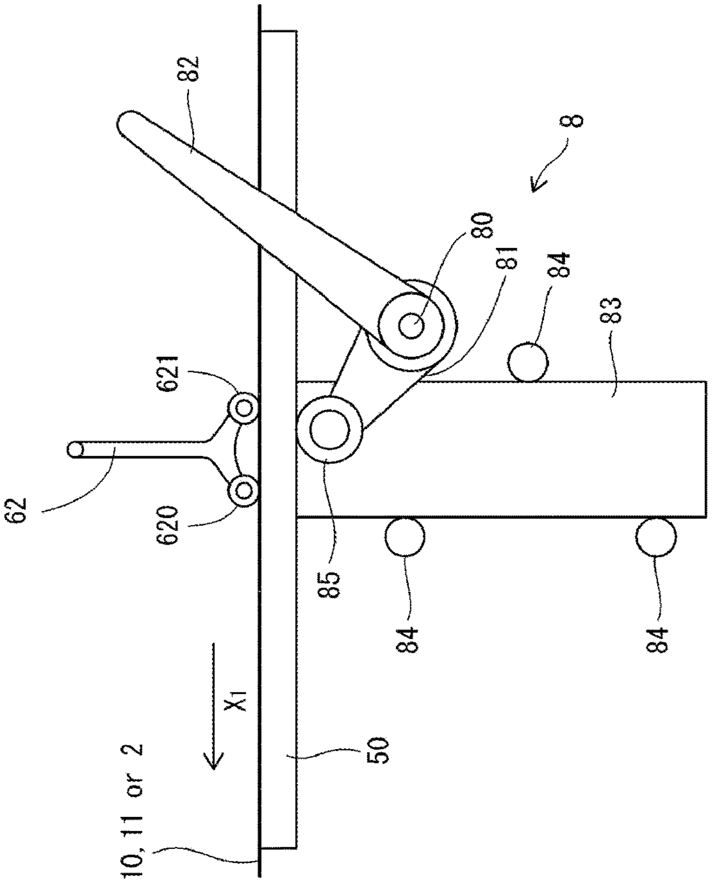
FIGS. 15A and 15B are front views of the lifting mechanism of FIG. 14.
Figure 15A:
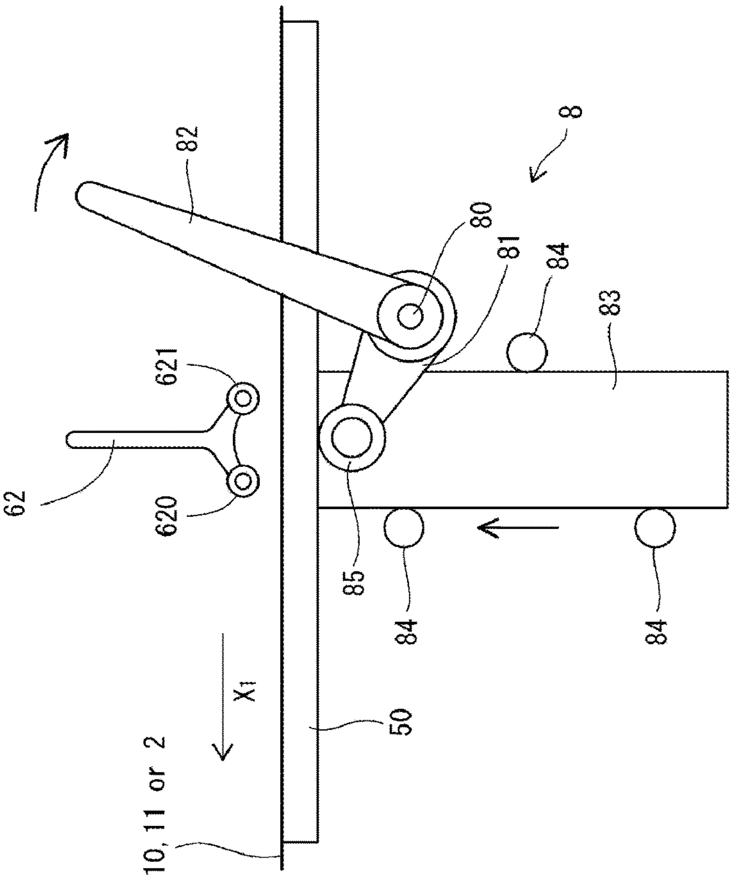

As illustrated in FIGS. 14, 15A, and 15B, the defect detecting device 5 further includes a lifting mechanism 8 for lifting and lowering the lower base 50. The lifting mechanism 8 includes: a rotation shaft 80 located under the lower base 50, extending in the width direction of the sheet panels 10 and 11 and supported by a frame (not shown) to be rotatable around its axis; at least one lift arm 81 attached to the rotation shaft 80 to rotate together with the rotation shaft 80; and at least one lever 82 for operation coupled to the rotation shaft 80. In the example, two lift arms 81 are spaced from each other in the axial direction of the rotation shaft 80, and one of the levers 82 is provided on one end of the rotation shaft 80.

As illustrated in FIGS. 15A and 15B, the lifting mechanism 8 further includes a slider 83 that has a post shape and extends downward from the lower surface of the lower base 50, and guide rollers 84 disposed to sandwich the slider 83 therebetween so as to guide the slider 83 in the vertical direction. Each of the lift arms 81 includes a lift roller 85 on its tip. The lift roller 85 is in contact with the lower surface of the lower base 50 and supports the lower base 50. Thus, the lift roller 85 preferably has high wear resistance and has a smooth surface.

According to the configuration described above, the operation of the lever 82 causes the lift arms 81 to rotate in unison around the rotation shaft 80 together with the rotation shaft 80. This enables the lower base 50 to be lifted and lowered by the guide rollers 84 and the lift rollers 85 with its upper surface maintained horizontal. A lifting mechanism having another configuration may be used for lifting and lowering the lower base 50.

A user can bring the component 10, 11, or 2 with no defect placed on the lower base 50 into contact with the contactors 620 and 621 of the arm 62 as illustrated in FIG. 15B by operating the lever 82 of the lifting mechanism 8 as illustrated in FIG. 15A to lift the lower base 50. Accordingly, even before operation of the bag making apparatus, the reference value (normal value) can be measured using the sensor 63 (not illustrated in FIGS. 14, 15A, and 15B). Thereafter, the user operates the lifting mechanism 8 to lower the lower base 50 to its original position. A lifting amount of the lower base 50 may be, for example, approximately several dozen millimeters, for example, approximately 12 mm, which is negligible for a long pass line of the sheet panels 10 and 11 in the bag making apparatus and does not affect bag making.

What is claimed is:

1. A defect detecting device for detecting a defect in bag making and for use in a bag making apparatus that intermittently feeds a sheet panel having a web shape in a longitudinal direction of the sheet panel, the defect detecting device comprising a detection unit, the detection unit comprising:

a support;

an arm supported by the support swingably around a swing shaft; and a sensor for detecting a displacement of the arm relative to the support, the arm comprising a first contactor and a second contactor that are spaced at a predetermined angular distance from each other around the swing shaft, the defect detecting device further comprising a movement mechanism for moving the detection unit between a first position where the first and second contactors are away from a feed plane for the sheet panel and a second position where the first and second contactors reach the feed plane, the movement mechanism being configured to, during a feed phase of the sheet panel, keep the detection unit located at the first position, and to, during a pause phase of the sheet panel, move the detection unit to the second position and then move the detection unit from the second position, the defect detecting device further comprising a determination part configured to determine whether the defect is present at least based on data from the sensor obtained when the detection unit is located at the second position.

2. The defect detecting device according to claim 1, wherein the determination part is configured to determine that the defect is not present if a detection value obtained by the sensor when the detection unit is located at the second position is equal to a reference value, and determine that the defect is present if the detection value deviates from the reference value, or determine that the defect is not present if the detection value is within a reference range, and determine that the defect is present if the detection value is outside the reference range.

3. The defect detecting device according to claim 2, wherein the sensor is a range sensor disposed to measure a distance between the arm and the support, and wherein the determination part is configured to determine that the defect is not present if a distance measured when the detection unit is located at the second position is equal to the reference value, and determine that the defect is present if the measured distance deviates from the reference value, or determine that the defect is not present if the measured distance is within the reference range, and determine that the defect is present if the measured distance is outside the reference range.

4. The defect detecting device according to claim 1, further comprising a warning device configured to output a warning when the determination part determines that the defect is present.

5. The defect detecting device according to claim 1, wherein the first and second contactors are spaced from each other in a width direction of the sheet panel.

6. The defect detecting device according to claim 1, wherein each of the first and second contactors is a rolling element.

7. The defect detecting device according to claim 1, wherein the detection unit further comprises a biasing member disposed to bias the first and second contactors toward the sheet panel which is in the feed plane, when the detection unit is located at the second position.

8. A bag making apparatus for successively making bags from a sheet panel having a web shape and an accessory component, the bag making apparatus comprising:

a feed device configured to intermittently feed the sheet panel in a longitudinal direction of the sheet panel;

a supply device configured to supply the accessory component to the sheet panel; and the defect detecting device according to claim 1.

9. The bag making apparatus according to claim 8, wherein the defect detecting device is disposed to detect a misalignment of the accessory component relative to the sheet panel.

10. The bag making apparatus according to claim 8, wherein the supply device is configured to supply a gusset as the accessory component, and wherein the defect detecting device is disposed to detect a folding failure of the gusset.

11. The bag making apparatus according to claim 10, wherein the supply device supplies, as the gusset, a side gusset folded in halves to the sheet panel during every intermittent feed cycle of the sheet panel.

* * * * *